(No Model.)

E. Y. MOORE.
DIFFERENTIAL PULLEY BLOCK.

No. 467,513. Patented Jan. 26, 1892.

Witnesses.
C. H. Keeney.
Anna V. Faust.

Inventor.
Edward Y. Moore
By C. T. Benedict
Attorney.

UNITED STATES PATENT OFFICE.

EDWARD Y. MOORE, OF MILWAUKEE, WISCONSIN.

DIFFERENTIAL PULLEY-BLOCK.

SPECIFICATION forming part of Letters Patent No. 467,513, dated January 26, 1892.

Application filed July 6, 1891. Serial No. 398,505. (No model.)

*To all whom it may concern:*

Be it known that I, EDWARD Y. MOORE, of Milwaukee, in the county of Milwaukee and State of Wisconsin, have invented a new and useful Improvement in Differential Pulley-Blocks, of which the following is a description, reference being had to the accompanying drawings, which are a part of this specification.

My invention relates to a pulley-block in which differential gear is embodied, forming an apparatus for raising and lowering great loads at a slow speed by means of a comparatively small amount of power moving through a much greater space and preferably at much greater speed.

The object of my invention is to improve mechanism heretofore in use, whereby friction is obviated, a more desirable differential movement is secured, and the facility with which the apparatus can be operated is made greater.

Figure 1:
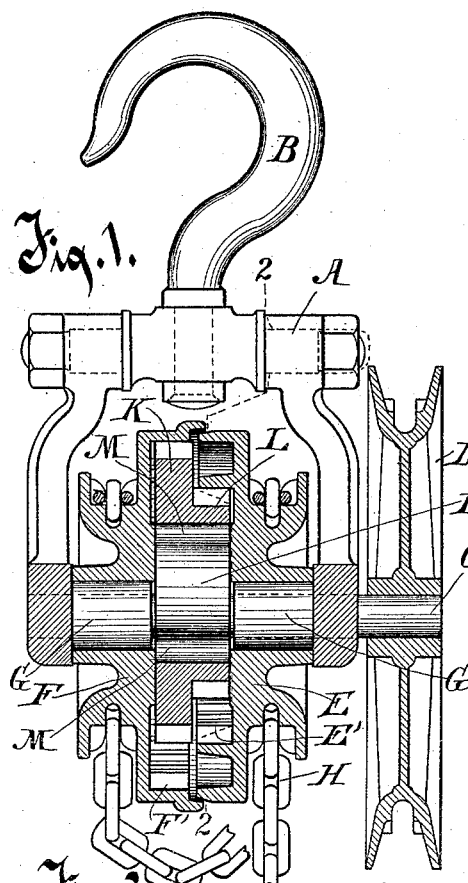
Figure 2:
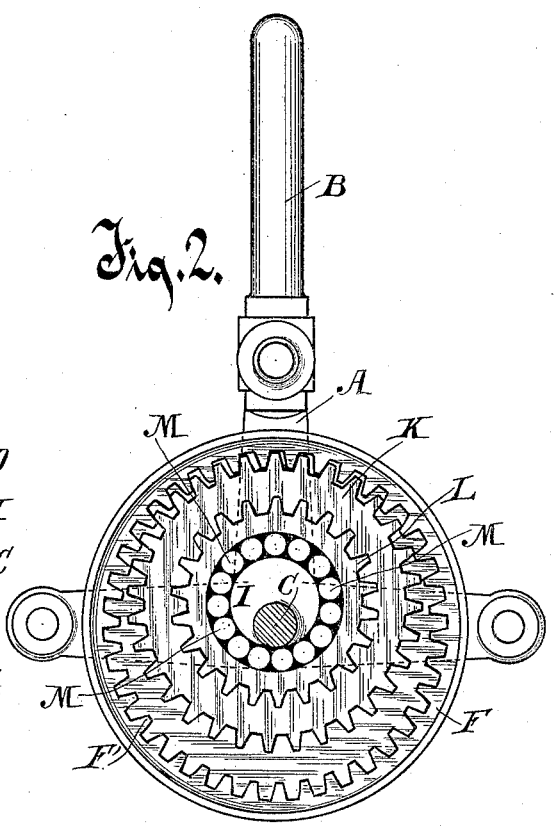
Figure 4:
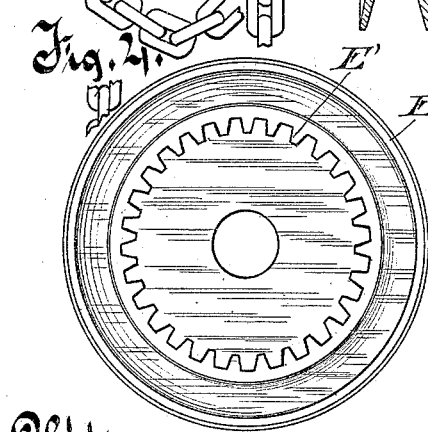
Figure 3:
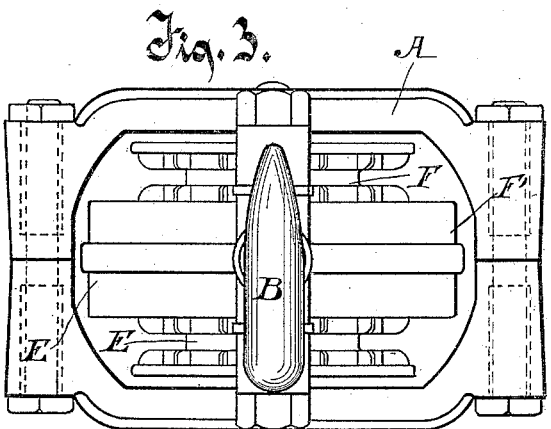

In the drawings, Figure 1 is a view, partly in elevation and partly in vertical section, of my improved device. Fig. 2 is a section on line 2 2 of Fig. 1, looking toward the left. Fig. 3 is a top plan view of the device. Fig. 4 is a side view of one of the chain-wheels, being the one at the right of the line 2 2 in Fig. 1.

A is the frame of the pulley-block, which is of suitable size and form to support the operative mechanism. The hook B is swiveled in the top of the frame and is adapted for suspending the pulley-block. An axle C is journaled in the frame and is provided with the chain-wheel D fixed thereon. An endless chain (not shown in the drawings) runs on this wheel and is adapted for rotating the wheel by hand for operating the mechanism. Two other chain-wheels E and F, of equal diameter, are loose on the studs or bosses G, which, being pierced centrally by the axle C, are in the nature of sleeves about the axle, the bosses being integral with or rigid to the frame. The wheels E and F are concentric with the axle C. A chain H runs on the two wheels E and F, the chain being so arranged that it runs over one wheel, as E, from front to rear or from rear to front and is carried diagonally beneath the wheels to the other wheel F and runs over that wheel in the same direction from front to rear or from rear to front. The load is supported conveniently by a yoke (not shown in the drawings) attached to the free ends of the chain, which yoke, supporting the load, rises and falls evenly, the extremities of the chain to which it is attached being pendent from the wheels on the two sides of the axle C. It is not necessary that the chain running on the two wheels E and F should be integral; but, instead, there may be two chains, one running on each wheel, it being only necessary that the load be supported on two extremities of the chain or chains, one from each wheel, and depending therefrom on opposite sides of the axle C.

Interposed between the wheels E and F a cylindrical eccentric I, fixed on the shaft C, rotates therewith, and two cog-wheels, a greater wheel K, and a smaller wheel L, constructed integrally and concentric with the eccentric I, are thereby carried around the axle C and rotate on the eccentric on the antifriction rollers M, interposed between the wheels and the eccentric. These rollers M serve merely as anti-friction bearings for the integral double wheel K L. The chain-wheel E is provided with an internal cog-wheel gear E', which meshes with the teeth of the smaller cog-wheel L; but the gear E' is considerably larger and contains more teeth than the cog-wheel L does, which number may differ in almost any ratio that is desired, but which in the drawings are twenty-eight in the gear E' and twenty-two in the wheel L. The chain-wheel F is provided with an internal gear F', which meshes with the cog-wheel K, but which is larger and contains more teeth than the cog-wheel K does. This difference in the number of teeth in the gear F' and the wheel K may vary, as desired, but in the drawings are shown to be thirty-eight and thirty-two, respectively, so that the difference (ten in the device shown) in the number of the cogs on the wheels L and K is the same as the difference in the number of cogs on the wheels E and F. The teeth on the wheels E and L and the teeth on the wheels F and K, that respectively mesh with each other, are constructed with the same pitch, and are so proportioned as not to wedge upon, strain, or unduly grind each other. These several wheels and their supporting devices are so constructed and arranged that the wheels L and K, as they roll around the axle C with the eccentric I, are constantly in mesh with the wheels E and F on that side of the axle at which the eccentric has the greatest radius and are otherwise out of gear therewith.

The action of the mechanism is substantially as follows: The load suspended on the extremities of the chain H, depending on opposite sides of the axle C from the wheels E and F, respectively, tends to rotate the lifting-wheels E and F in opposite directions. The integral wheels L and K, however, meshing with the wheels E and F, prevent rotation of these wheels in opposite directions, except to the extent caused or permitted by the rotation of the integral pinion or wheels L and K about against the wheels E and F. The eccentric I, being rotated about the shaft, puts the teeth of the wheels L and K successively into mesh with the wheels E and F until (for example) the wheel K has completed a revolution of the wheel F, making one and six thirty-seconds revolutions, which will not carry the wheel L (integral with K) around the wheel E (as one and six twenty-eighths revolutions of the wheels L and K are required to complete a revolution of the wheel E) and the peripheries of the wheels L and K will have moved with reference to each other fifteen two hundred and sixty-sixths (60-1064) of a revolution. Thus while the wheels E and F move differentially, actuated by the integral pinion or wheels L and K, forcing or permitting the movement of the two wheels in opposite directions, acting as a fulcrum on either wheel, and the two wheels E and F thus moving differentially let off or take up a corresponding portion of the lifting-chain, the action of the pinion and the gravity of the load causes the wheels E and F to rotate on their bearings sufficiently to constantly and equally support the load. This movement of the eccentric and the train of related mechanism is accomplished by rotating the wheel D—by means of the endless hand-chain (not shown) running thereon—and it will be understood that by rotating the wheel D in the reverse direction the opposite movement of the load can be obtained.

By reason of the peculiar construction and arrangement of the several wheels and their bearings in this apparatus the leverages and resistances are such that, aided by the friction of the mechanism, the weight of the load on the chains will not reverse the motion of the apparatus nor permit the load to run down by its gravity.

What I claim as new, and desire to secure by Letters Patent, is—

1. The combination, with a suitable frame, of an axle journaled therein, two lifting-chain wheels of equal diameter having internal gear-wheels of different size, an eccentric rigid on the axle, and two integral gear-wheels of different size meshing, respectively, with the gear on the lifting-chain wheels, the gears thus in mesh being different in size, whereby, by the rotation of the eccentric, a differential rotation of the lifting-chain wheels in opposite directions is obtained, substantially as described.

2. In a differential lifting apparatus, the combination, with two lifting-chain wheels, each provided with gear-teeth, the wheels being revolubly loose in the frame, of an eccentric fixed on an axle revoluble concentrically with the lifting-chain wheels, and two integral cog-wheels of unequal diameter loose on the eccentric, meshing, respectively, differentially with the lifting-chain wheels, substantially as described.

3. In a differential lifting apparatus, the combination, with a frame and two lifting-chain wheels provided with gear and revolubly loose in the frame, of a cylindrical eccentric fixed on an axle journaled in the frame, two integral cog-wheels of unequal diameter about the eccentric meshing with the lifting-chain wheel, and bearing-rollers interposed between the eccentric and the cog-wheel, substantially as described.

4. In a differential lifting apparatus, the combination, with two lifting-chain wheels revolubly loose in the frame, each wheel being provided with gear-teeth, of an eccentric fixed on an axle revoluble concentrically with the lifting-chain wheels, and two integral cog-wheels of unequal diameter loose on the eccentric, meshing, respectively, differentially with the lifting-chain wheels, and bearing-rollers interposed between the eccentric and the cog-wheels, substantially as described.

5. In a differential apparatus, the combination, with lifting-chain wheels provided with internal gears having a certain number of teeth, of cog-wheels of smaller diameter and fewer teeth revoluble on and rotatable eccentrically about the axis of the chain-wheels and meshing therewith, and teeth on the wheels meshing with each other and, though different in number, having the same pitch, substantially as described.

6. In a differential apparatus, the combination, with a suitable frame, of an axle journaled therein, an eccentric rigid on the axle, integral cog-wheels of different size revoluble on and rotatable with the eccentric, chain-wheels of equal diameter having internal gears of different size and meshing, respectively, with but larger than the cog-wheels with which they respectively mesh, lifting-chains running on the chain-wheels, and a suitable load-supporting device supported on two legs of the lifting-chains running on different wheels and depending from radially-opposite sides thereof, whereby a load on the load-supporting device will not be let down by its gravity, substantially as described.

In testimony whereof I affix my signature in presence of two witnesses.

EDWARD Y. MOORE.

Witnesses:
SAML. R. WALLACE,
T. W. DAVIS.